United States Patent Office 3,399,145
Patented Aug. 27, 1968

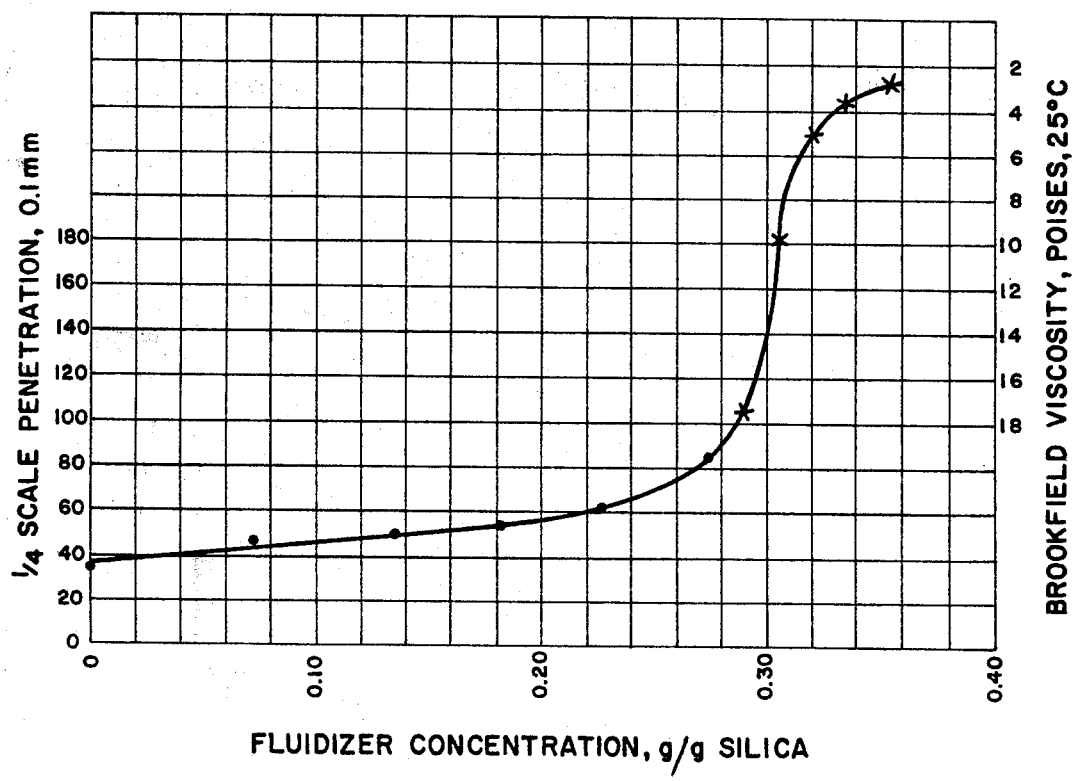

3,399,145
DISPERSION OF FINELY DIVIDED SOLID IN NON-AQUEOUS LIQUID
Thomas W. Martinek, Crystal Lake, and Donald L. Klass, Barrington, Ill., assignors, by mesne assignments, to Union Oil Company of California, Los Angeles, Calif., a corporation of California
Filed Aug. 5, 1964, Ser. No. 387,691
1 Claim. (Cl. 252—309)

ABSTRACT OF THE DISCLOSURE

Finely divided boron dispersed in mineral oil and glycerol monooleate is used for electroviscous fluid.

One of the objects of this invention is to provide a method of dispersing finely divided solid material in non-aqueous liquids.

Another object of this invention is to provide a method of preparing dispersions of solids in non-aqueous liquids having a high solids content for a given viscosity or penetration value.

Still another object of the invention is to determine the maximum amount of solid that can be dispersed in a non-aqueous liquid without exceeding a predetermined viscosity or penetration value.

A still further object of the invention is to provide a method for reducing the viscosity and/or increasing the penetration value of a dispersion of a solid in a non-aqueous liquid.

Still another object is to provide dispersions having high solid content in non-aqueous liquids and of relatively low viscosity and/or high penetration.

Other objects may become manifest from the following description of the invention and the accompanying drawing, which is a graph showing critical relationship of constituents in a specific composition prepared in accordance with the invention.

We have discovered that by providing a critical ratio of surfactant to finely divided solid material in dispersions of such material in non-aqueous liquids of low dielectric constant, that is, having a dielectric constant below approximately 5, larger amounts of solid material can be dispersed in the liquid than was considered heretofore possible without imparting undesirably high viscosity or low penetration value to the dispersion. The invention is useful in many areas which involve the use of a solid material dispersed in a non-aqueous oleaginous liquid, such as in the preparation of silica or other greases using finely divided solid particles as the thickening agent, and in the preparation of electric-field-responsive fluids, such as those disclosed in U.S. Patents 2,886,151; 3,105,379 and 3,047,507, where high concentrations of silica or other solid material is desired in order to obtain higher forces.

Our invention is applicable to a wide variety of non-aqueous oleaginous liquids having low dielectric constants. As examples of such liquids may be mentioned fluorocarbon compounds, such as trifluoro- and hexafluorobenzene; chlorinated hydrocarbons, such as trichloroethylene; esters of polybasic acids, such as di-2-ethylhexyl sebacate and di-2-ethylhexyl azelate; trialkyl phosphates, such as Cellulube 90 and Cellulube 550; polyoxypropylene glycols, such as those marketed under the name Ucon LB; various mineral oil fractions, such as mineral seal oil, kerosene, lubricating oil fractions; and pure hydrocarbons, such as benzene, toluene, xylene, 1-dodecene, n-dodecane, n-hexadecane, 1-hexadecene, dioctyl ether, 1-decene and n-decane.

The invention is also applicable to a wide variety of solid materials, including titanate salts, such as barium, calcium, strontium, magnesium and zinc; different types of aluminas, including eta, alpha and gamma; ion exchange resins, such as Rohm & Haas type III CG–120 (sodium polysulfonate) and CG–50 (polycarboxylic acid); basic aluminum acetate; silica; boron; silica-alumina; magnesia; alumina; calcium carbonate; barium sulfate; activated carbon and carbon black.

A number of surfactants are useful as dispersing agents in preparing compositions in accordance with our invention. In addition to glycerol monooleate, may be mentioned:

| Trade name | Chemical name |
| --- | --- |
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Consensation of hydrogenated tallow amide and ethylene oxide. |
| Hyonic FA-75 | Modified fatty alkylolamide. |
| Miranol HM Concentrate | Ethylene cyclomide 1-lauryl, 2-hydroxy ethylene Na alcoholate, methylene Na carboxylate. |
| Miranol MM Concentrate | Same as Miranol HM except myristyl group is substituted for lauryl group. |
| Nacconal NR | Alkyl aryl sulfonate. |
| Ninol AA62 | Lauric diethanolamide. |
| Nonol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sulfonate. |
| Sulfanole FAF | Sodium salt of fatty alcohols, sulfated. |
| Tritol AS-30 | Sodium lauryl sulfate. |
| Triton X-100 | Alkyl aryl polyether alcohol. |

We prefer to use non-ionic surfactants, although cationic, anionic and mixtures of these with each other or with non-ionic surfactants may be employed. In some instances, mixed surfactants or a mixture of a surfactant with a low molecular weight organic acid or alcohol is superior to a single surfactant in that a synergistic effect is obtained resulting in ability to disperse greater amounts of solid for a given viscosity or penetration value. The critical ratio of surfactant to solid material required to obtain the maximum fluidization effect is a function of the physical state of the particles. In general, the more porous and smaller size particles require more fluidizer than non-porous and larger size particles. About 2–3 molecules of fluidizer per square millimicron of external solid surface area is required for maximum fluidization. Intermediate fluidization is obtained by using lesser amounts of the surfactant or fluidizer.

In carrying out our invention, the desired solid material in finely divided form, preferably in sizes between 10 millimicrons and 10 microns, is added in weighed amount to a selected vehicle and the mixture is milled, if necessary, for homogeneity until a grease is formed. Small increments of the selected surfactant are then added until an abrupt decrease in consistency of the grease structure occurs. The penetration and/or the viscosity of the dispersion is measured. Further small increments of surfactant are added alternated with measurement of penetration and/or viscosity to determine when no further significant change in viscosity and/or penetration occurs.

By plotting consistency and/or viscosity versus concentration of surfactants in grams per gram of solid phase, the critical ratio of fluidizer to solid can be determined. This critical ratio is applicable to any dispersion composed of the same materials up to a certain limit. For example, if a dispersion is made with a 40% by weight solid content and the procedure heretofore outlined is used to determine the critical ratio of surfactant to solid, this same ratio can be used to prepare a dispersion of higher concentrations of the same solid material in the same liquid using the same dispersant or fluidizer. Furthermore, by incrementally adding the solid material and dispersant in the aforesaid determined critical ratio to the liquid vehicle or carrier and determining the viscosity and/or penetration of the dispersion after each addition, it can be determined how much of the solid material can be dispersed in the liquid carrier at any desired viscosity or penetration value. Thus, if it is desired to prepare a dispersion having a preselected maximum viscosity and/or penetration value, the desired dispersion can be prepared from information previously obtained as to the critical ratio of surfactant to solid material to give maximum fluidization.

It will also be apparent that it is possible to prepare tables, graphs or charts for any given dispersion showing viscosity and/or penetration value versus solid material content and from this information determine the solid content of a dispersion of any known viscosity and/or penetration value or prepare a dispersion having a preselected viscosity and/or penetration value.

The following specific examples will demonstrate the invention:

Example I

Boron particles having a density of 2.32 grams per cc. and a size from about 0.2 to 10μ, were dispersed in neutral oil having an SUS viscosity at 100° F. of 80, in a ratio of 63.4% by weight of boron particles to 36.6% by weight of neutral oil. The resulting product was a tough, barely workable grease. This was cut back with more neutral until the solid content was about 50% by weight and a grease with a penetration (¼ scale) of about 80 was obtained using a modified ASTM–D–1403–56T method. Glycerol monooleate was thereupon added in increments of approximately 0.1% and after thorough mixing, the penetration was determined. When the ratio of glycerol monooleate to boron was 0.0123 gram/gram boron, a dramatic increase in penetration value occurred. At this ratio it was possible to disperse 80% by weight of boron in the vehicle at a ¼ scale penetration of about 78. The fluidizer concentration was further increased from 0.012 to 0.0273 gram per gram of boron within appreciably altering the penetration values.

In the absence of the fluidizer, the maximum amount of boron that could be dispersed at this penetration was 50 weight percent.

Example II

A second dispersion was prepared in a manner similar to that set forth in Example I except that Kremol 40 was substituted for the neutral oil. Kremol 40 is a white mineral oil having a viscosity of 7.7 centipoises at 74° F. With this vehicle it was possible to disperse 67.5% by weight of boron in the absence of a fluidizer and obtain a satisfactory viscosity. By addition of glycerol monooleate fluidizer in the critical ratio set forth in Example I the solid content was increased to 75% with approximately the same consistency.

Example III

Silica aerogel having a $N_2$ surface area of 729 $M^2$/g., a pore volume of 0.30 cc. per gram and containing 9% of $H_2O$ and having an average particle size of 1–2 microns, was mixed with neutral oil having an SUS viscosity at 100° F. of 80. Penetration of the dispersion without addition of glycerol monooleate was determined and the penetration and viscosity of the dispersion having different amounts of glycerol monooleate were also determined. It was found for this dispersion that the critical ratio of glycerol monooleate to silica was in the range of about 0.28 to 0.32. The following table sets forth the composition of the various dispersions and the ¼ scale penetration values and Brookfield viscosities. Penetration values were obtained in accordance with the aforesaid modified ASTM method.

TABLE I.—DATA ON FLUIDIZATION OF SUSPENSIONS

| Formula number | Weight Percent | | | Oleate, g./g. silica | ¼ scale penetration | Brookfield viscosity, poises, 25° C. |
|---|---|---|---|---|---|---|
| | Silica | 80 neutral | Oleate | | | |
| 1 | 49.05 | 50.95 | | | 34 | |
| 2 | 47.34 | 49.19 | 3.47 | 0.073 | 46 | |
| 3 | 46.02 | 47.82 | 6.16 | 0.134 | 51 | |
| 4 | 45.05 | 46.82 | 8.13 | 0.180 | 55 | |
| 5 | 44.13 | 45.85 | 10.02 | 0.227 | 61 | |
| 6 | 43.19 | 44.88 | 11.92 | 0.276 | 86 | |
| 7 | 42.93 | 44.62 | 12.45 | 0.290 | 106 | 17.3 |
| 8 | 42.67 | 44.34 | 12.99 | 0.304 | >171 | 9.88 |
| 9 | 42.40 | 44.05 | 13.55 | 0.320 | | 4.88 |
| 10 | 42.15 | 43.78 | 14.07 | 0.334 | | 3.73 |
| 11 | 41.78 | 43.38 | 14.84 | 0.355 | | 2.95 |
| 12 | 56.13 | 27.03 | 16.84 | 0.30 | 19 | |
| 13 | 56.10 | 26.51 | 17.39 | 0.31 | 31 | |
| 14 | 56.07 | 25.99 | 17.94 | 0.32 | 29 | |
| 15 | 46.78 | 39.19 | 14.03 | 0.30 | 95 | |
| 16 | 46.75 | 38.76 | 14.49 | 0.31 | 103 | |
| 17 | 46.72 | 38.33 | 14.95 | 0.32 | 103 | |

The drawing is a graph on which has been plotted the points taken from the table in Example III. The graph demonstrates the sharp rise in penetration which occurred at a ratio of surfactant to silica of about 0.28 and the straightening out of the curve which occurred in the area of about 0.33–0.34.

It has been previously pointed out that the physical characteristics of the solid material affect the amount of surfactant that is necessary to lower the viscosity or increase the penetration of the dispersant. It has also been found that the density of the liquid in which the solid is dispersed with affect the quantity of solid which can be dispersed therein. For example, in liquids having a density of 0.7 gram per cc. or lower, such as n-decane, n-dodecane, 1-n-hexadecene, it is possible to prepare dispersions containing as high as 85% by weight of boron particles of the size used in Example I and obtain a dispersion of satisfactory consistency. On the other hand, with liquids having a density of about 1 gram per cc. or higher, it is not possible to obtain dispersions of satisfactory viscosity and penetration with concentrations of boron above about 75% by weight.

It will be seen that by means of the procedure hereinabove set forth it is possible not only to prepare dispersions of high solid content at satisfactory viscosities and penetrations but that it is possible to predict what the viscosity or penetration of any known composition will be and that it is possible to determine the solid contents of a composition by measuring the viscosity and/or penetration thereof.

The embodiments of the invention in which an exclusive property or privilege is claimed are defined as follows:

1. A composition of matter consisting essentially of
 (a) a mineral oil fraction with an SUS viscosity of about 80 at 100° F.
 (b) about 80 weight percent of finely divided boron dispersed in said mineral oil fraction and having a particle size of about 0.25 micron, a density of about 2.32 g./cc., and
 (c) glycerol monooleate, the weight ratio of glycerol monooleate to boron being 0.0123, the remainder of said composition being the neutral mineral oil fraction.

References Cited

UNITED STATES PATENTS 3,047,507 7/1962 Winslow _____ 252—75
3,196,059 7/1965 Godfrey _____ 149—19

LEON D. ROSDOL, *Primary Examiner.*

RICHARD D. LOVERING, *Assistant Examiner.*